United States Patent
Ahn et al.

(10) Patent No.: US 9,064,431 B2
(45) Date of Patent: Jun. 23, 2015

(54) FLEXIBLE DISPLAY DEVICE HAVING A FOLDING DEVICE INCLUDING A PLURALITY OF LINK MEMBERS

(71) Applicants: Sung-Sang Ahn, Yongin (KR); Sang-Hyun Lim, Yongin (KR)

(72) Inventors: Sung-Sang Ahn, Yongin (KR); Sang-Hyun Lim, Yongin (KR)

(73) Assignee: SAMSUNG DISPLAY CO., LTD., Yongin, Gyunggi-Do (KR)

( * ) Notice: Subject to any disclaimer, the term of this patent is extended or adjusted under 35 U.S.C. 154(b) by 152 days.

(21) Appl. No.: 13/628,503

(22) Filed: Sep. 27, 2012

(65) Prior Publication Data

US 2013/0342090 A1    Dec. 26, 2013

(30) Foreign Application Priority Data

Jun. 26, 2012    (KR) .................. 10-2012-0068710

(51) Int. Cl.
*G06F 1/16*      (2006.01)
*G09F 9/33*      (2006.01)

(52) U.S. Cl.
CPC ............... *G09F 9/33* (2013.01); *G06F 1/1616* (2013.01)

(58) Field of Classification Search
CPC ........... G02F 1/133305; H04M 1/0268; H05B 33/02; G06F 1/1616; G06F 1/1641; G06F 1/1652; G09F 9/301
USPC ........................................ 361/679.01, 679.27
See application file for complete search history.

(56) References Cited

U.S. PATENT DOCUMENTS

| | | | |
|---|---|---|---|
| 8,125,759 B2* | 2/2012 | Fukuma et al. ............... 361/260 |
| 8,151,501 B2* | 4/2012 | Bemelmans et al. ........... 40/610 |
| 8,369,075 B2* | 2/2013 | Huang ..................... 361/679.21 |
| 8,385,055 B2* | 2/2013 | Kao et al. ................ 361/679.06 |
| 2010/0182265 A1 | 7/2010 | Kim et al. |
| 2010/0232100 A1* | 9/2010 | Fukuma et al. .......... 361/679.01 |
| 2011/0210937 A1 | 9/2011 | Kee et al. |
| 2012/0002360 A1* | 1/2012 | Seo et al. ................. 361/679.01 |
| 2012/0033353 A1* | 2/2012 | Huang ..................... 361/679.01 |
| 2012/0033354 A1* | 2/2012 | Huang ..................... 361/679.01 |
| 2012/0044620 A1* | 2/2012 | Song et al. ............... 361/679.01 |
| 2012/0120618 A1* | 5/2012 | Bohn ............................ 361/749 |
| 2012/0200991 A1 | 8/2012 | Ryu |
| 2012/0264489 A1* | 10/2012 | Choi et al. .................... 455/566 |
| 2012/0307423 A1* | 12/2012 | Bohn et al. ............. 361/679.01 |
| 2012/0307472 A1* | 12/2012 | Bohn et al. .................... 361/807 |
| 2012/0314399 A1* | 12/2012 | Bohn et al. .................... 362/97.1 |

(Continued)

FOREIGN PATENT DOCUMENTS

| | | |
|---|---|---|
| JP | 2004-118803 A | 4/2004 |
| KR | 10-2009-0087303 A | 8/2009 |
| KR | 10-2010-0082451 | 7/2010 |

(Continued)

OTHER PUBLICATIONS

Internet material—techcrunch.com/2009/10/07/sony-flexible-oled-display-on-display-at-ceatec.

*Primary Examiner* — Lisa Lea Edmonds
*Assistant Examiner* — Keith Depew
(74) *Attorney, Agent, or Firm* — Lee & Morse, P.C.

(57) ABSTRACT

A flexible display device includes a housing including a first support and a second support, the first support and the second support being coupled with each other so as to be folded and unfolded by a folding device, and a flexible panel coupled with the housing. The folding device includes a plurality of link members for rotatably connecting the first support and the second support to each other.

9 Claims, 5 Drawing Sheets

(56) References Cited

U.S. PATENT DOCUMENTS

| | | | |
|---|---|---|---|
| 2013/0010405 A1* | 1/2013 | Rothkopf et al. | 361/679.01 |
| 2013/0021762 A1* | 1/2013 | van Dijk et al. | 361/749 |
| 2013/0070431 A1* | 3/2013 | Fukuma et al. | 361/749 |
| 2013/0258565 A1* | 10/2013 | Nishi | 361/679.01 |
| 2014/0029171 A1* | 1/2014 | Lee | 361/679.01 |

FOREIGN PATENT DOCUMENTS

| | | |
|---|---|---|
| KR | 10-2010-0088983 A | 8/2010 |
| KR | 10-2011-0029089 A | 3/2011 |
| KR | 10-2011-0068799 A | 6/2011 |
| KR | 10-2011-0098349 | 9/2011 |
| KR | 10-2012-0002084 | 1/2012 |
| KR | 10-2012-0049762 A | 5/2012 |

* cited by examiner

_US 9,064,431 B2_

FLEXIBLE DISPLAY DEVICE HAVING A FOLDING DEVICE INCLUDING A PLURALITY OF LINK MEMBERS

CROSS-REFERENCE TO RELATED APPLICATION

This application claims the benefit under 35 U.S.C. §119 of Korean Patent Application No. 10-2012-0068710, filed on Jun. 26, 2012, in the Korean Intellectual Property Office, the disclosure of which is incorporated herein in its entirety by reference.

BACKGROUND

1. Field

Embodiments relate a flexible display device, and more particularly, to a flexible display device that is stably folded.

2. Description of the Related Art

Flat display apparatuses such as organic light-emitting display apparatuses have been developed to be of a flexible type whereby a panel is easily folded and unfolded.

SUMMARY

Embodiments are directed to a flexible display device including a housing including a first support and a second support, the first support and the second support being coupled with each other so as to be folded and unfolded by a folding device; and a flexible panel coupled with the housing, wherein the folding device includes a plurality of link members for rotatably connecting the first support and the second support to each other.

Each of the plurality of link members may include a first link member having a first end that is rotatably coupled with the first support, and a second link member having a first end that is rotatably coupled with the second support and a second end that is rotatably coupled with a second end of the first link member.

When the first support and the second support are horizontally unfolded, the first link member and the second link member may be horizontally unfolded, and an interval between the first support and the second support may be maximized.

Ends of the first and second supports, at which the folding device is installed, may have rounded edge portions.

The ends of the first and second supports, which have the rounded edge portions, together may form a semicircular shape when the housing is folded.

Two end portions of the flexible panel may be fixed to the first support and the second support, respectively, and a central portion of the flexible panel between the first support and the second support may be unfixed.

The flexible panel may be attached to an external surface of the housing when the housing is folded.

When the housing is folded, the first support and the second support may contact each other.

The flexible display device may further include a locking device for locking the housing when the first support and the second support contact each other.

The locking device may include a magnet that is installed on the first support and the second support to couple the first support and the second support with each other by using a magnetic force.

The locking device may include an elastic hook that is installed on any one of the first support and the second support.

The flexible display device may further include gear members that are rotatably installed on the first support and the second support, respectively, to be engaged with each other.

BRIEF DESCRIPTION OF THE DRAWINGS

The above and other features will become more apparent by describing in detail exemplary embodiments thereof with reference to the attached drawings in which.

DETAILED DESCRIPTION

Embodiments will now be described more fully with reference to the accompanying drawings, in which exemplary embodiments are shown.

Figure 1A:
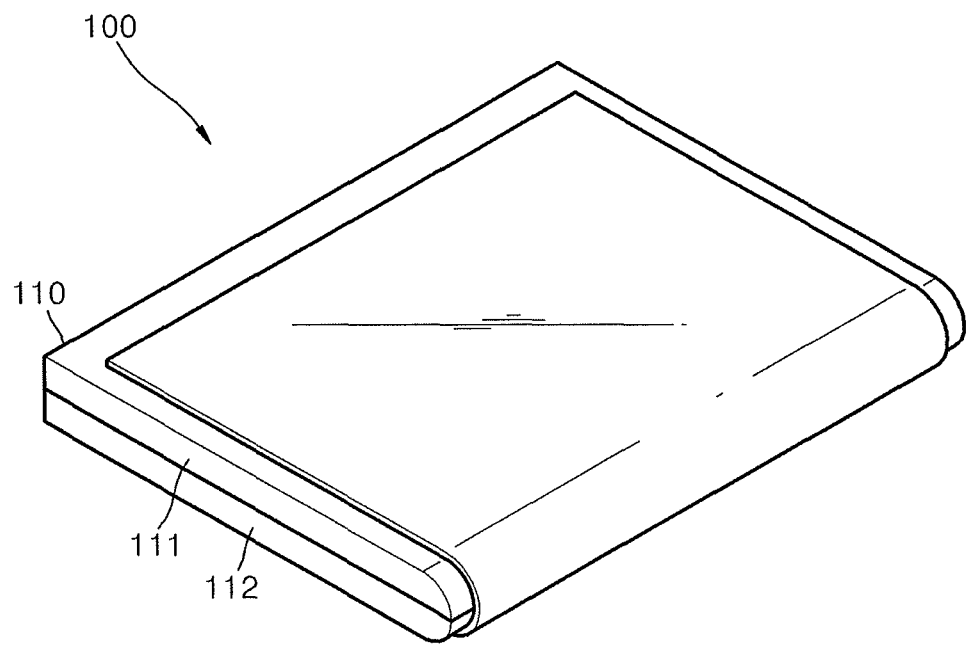
FIG. 1A is a perspective view of a folding state of a flexible display device according to an embodiment.
Figure 3A:
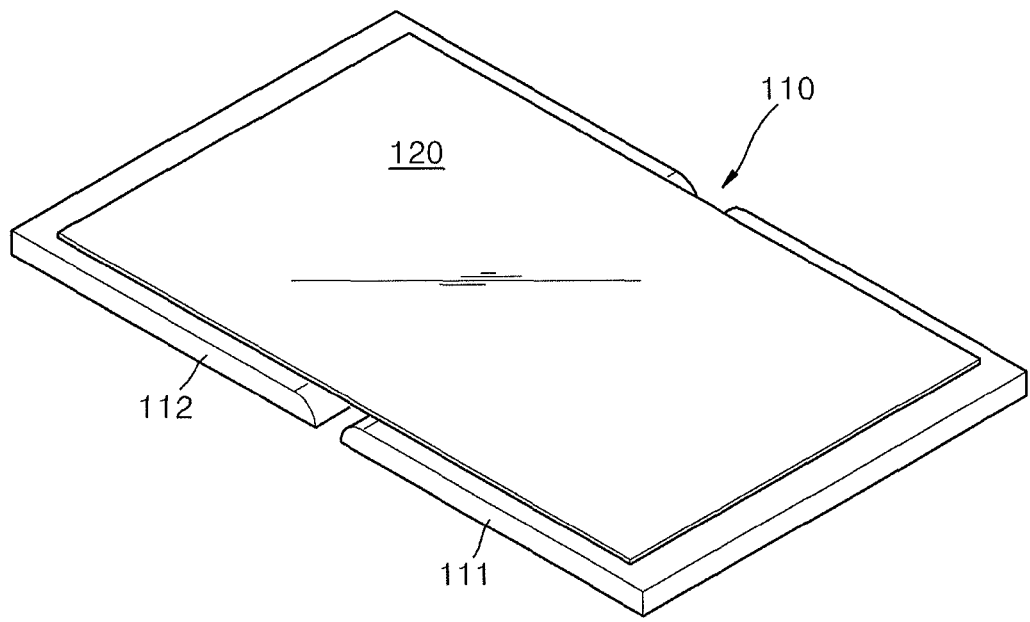
FIG. 3A is perspective view of a state where the flexible display device of FIG. 1A is completely unfolded.
Figure 3B:
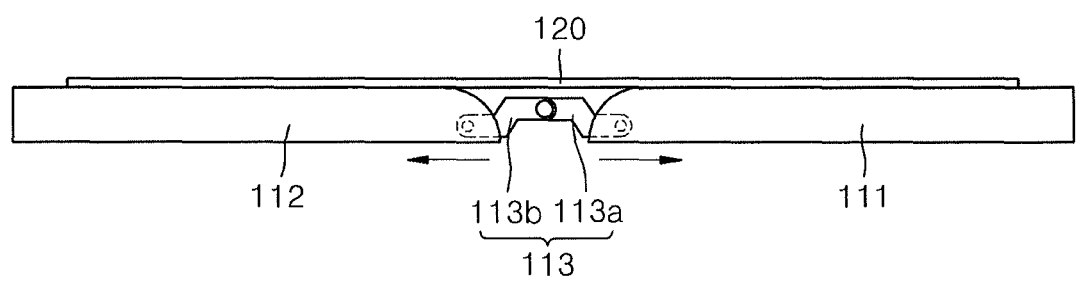
FIG. 3B is a side view of the flexible display device of FIG. 3A.

FIGS. 1A through 3B are diagrams of a flexible display device 100 according to an embodiment. FIGS. 1A and 1B show a folding state of the flexible display device 100, FIGS. 2A and 2B show a state in which the flexible display device 100 is unfolded about halfway, and FIGS. 3A and 3B show a state in which the flexible display device 100 is completely and horizontally unfolded.

Figure 1B:
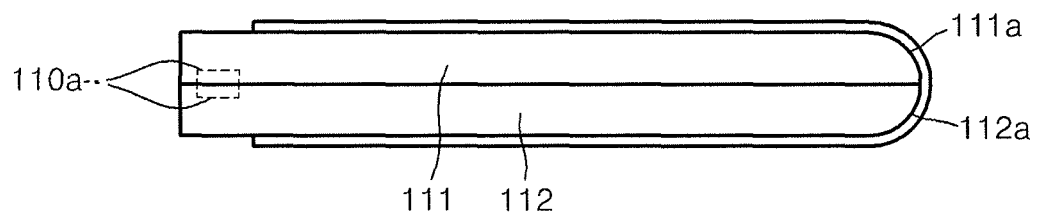
FIG. 1B is a side view of the flexible display device of FIG. 1A.
Figure 2A:
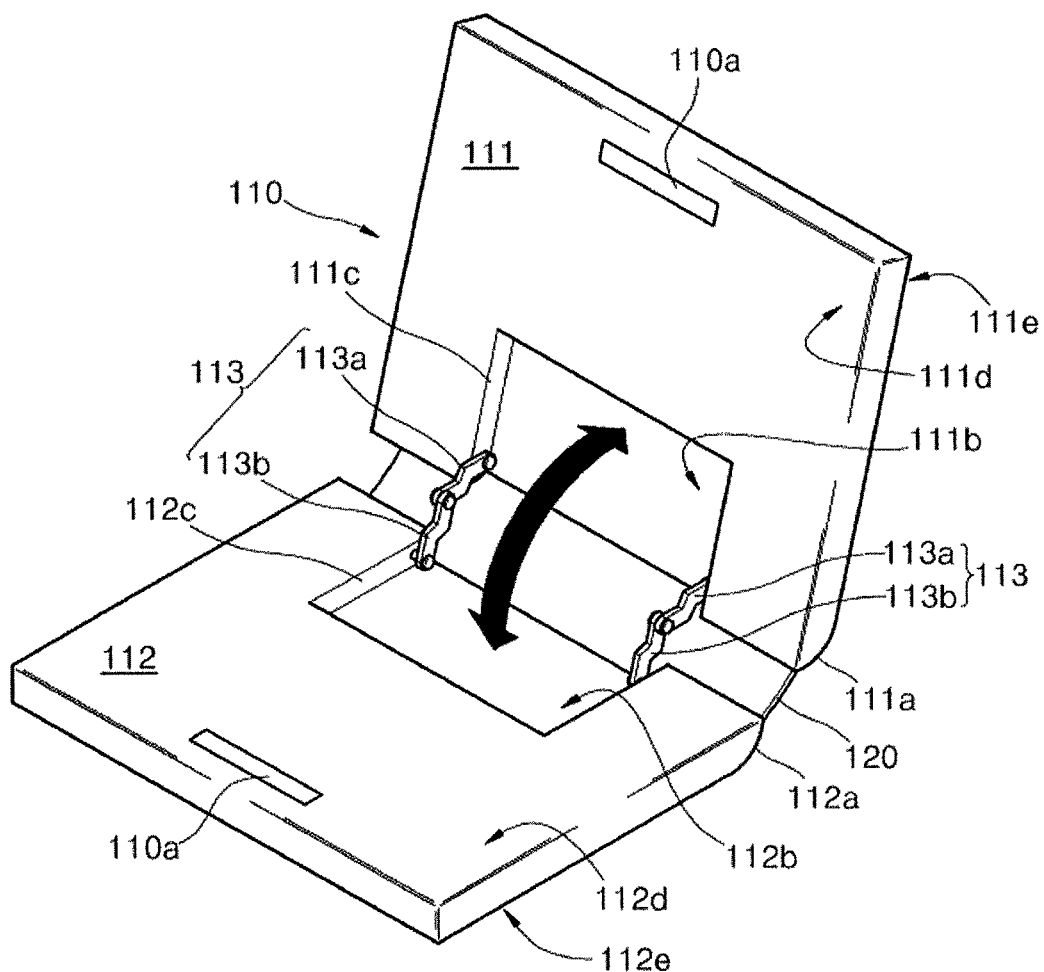
FIG. 2A is a perspective view of a state where the flexible display device of FIG. 1A is unfolded halfway.
Figure 2B:
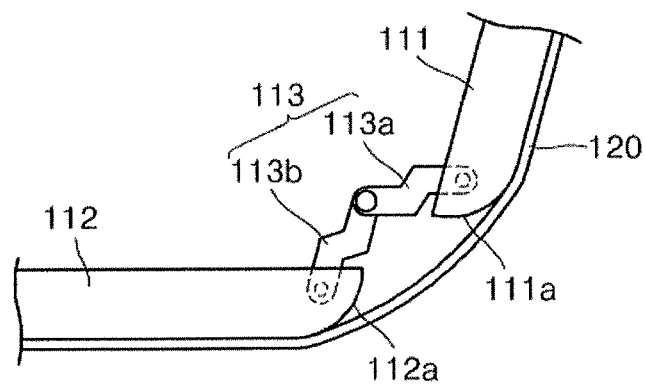
FIG. 2B is a side view of a portion of the flexible display device of FIG. 2A.

As shown in FIGS. 1A and 1B, the flexible display device 100 includes a housing 110 that may be completely folded in half and may be horizontally unfolded, and a flexible panel 120 attached to an external surface of the housing 110.

The flexible panel 120 is a display unit formed by stacking a thin film transistor (TFT), a light-emitting device, and an encapsulation layer for covering and protecting the TFT and the light-emitting device on a substrate formed of a flexible plastic material such as polyimide. Hereinafter, these components are collectively referred to as the flexible panel 120. The flexible panel 120 is formed of a flexible substrate. Accordingly, the flexible panel 120 may be smoothly folded and modified, as shown in FIGS. 1A through 3B.

The housing 110 is a support for supporting the flexible panel 120 and for stably folding and unfolding the flexible panel 120. The housing 110 may have the structure shown in FIGS. 2A and 2B.

Referring to FIGS. 1A through 3B, the housing 110 includes a first support 111 and a second support 112 that are fixed to two end portions of the flexible panel 120. In the example embodiment shown in FIG. 2A, the first support 111 has a first side 111d and a second side 111e, the flexible panel 120 being on the second side 111e of the first support 111. The second support 112 has a first side 112d and a second side 112e, the flexible panel 120 being on the second side 112e of the second support 112. The first and second supports 111 and 112 are connected to be folded and unfolded by a folding device 113 including a plurality of link members, that is, a first link member 113a having a first end that is rotatably coupled with the first support 111, and a second link member 113b having a first end that is rotatably coupled with the second support 112. The first support 111 has a first recess 111b therein, and the second support 112 has a second recess 112b therein. The first link member 113a is coupled to a sidewall 111c of the first recess 111b. The second link member 113b is coupled to a sidewall 112c of the second recess 112b. Second ends of the first and second link members 113a and 113b are rotatably coupled with each other. Thus, the first and second link members 113a and 113b may be horizontally unfolded and may be folded to be stacked on each other according to an operation of folding and unfolding the housing 110.

If the housing 110 is folded to a folding state shown in FIGS. 1A and 1B, the first and second link members 113a and 113b are folded with respect to connecting portions as an axis to be stacked on each other, like scissors that are folded. In addition, if the housing 110 is completely unfolded to an open state as shown in FIGS. 3A and 3B, the first and second link members 113a and 113b are unfolded so as to be horizontally unfolded, like scissors that are unfolded.

The folding device 113 having the above-described structure may maintain a stable state when the flexible panel 120 is folded and unfolded.

That is, the folding device 113 may be provided by using the first and second link members 113a and 113b that are connected like scissors, when the housing 110 is unfolded, as shown in FIG. 3B. Accordingly, an interval between the first and second supports 111 and 112 may be slightly increased compared with a case where the housing 110 is folded. In other words, when the first and second link members 113a and 113b are horizontally unfolded, as shown in FIG. 3B, an interval between the first and second supports 111 and 112 may be maximized. When the housing 110 is folded such that the first and second link members 113a and 113b are bent to have a V shape, the interval between the first and second supports 111 and 112 is further reduced. As shown in FIG. 3B, when the housing 110 is completely unfolded such that the flexible panel 120 is in a flat state, if two end portions of the flexible panel 120 are fixed to the first and second supports 111 and 112, the flexible panel 120 may be maintained unfolded to be flat. In this state, when the housing 110 is folded, the first and second link members 113a and 113b may be folded like scissors and the interval between the first and second supports 111 and 112 may be slightly reduced, as described above. Accordingly, a longitudinal margin is formed at a central portion of the flexible panel 120, which is not fixed to the first and second supports 111 and 112. The central portion is a folded portion of the flexible panel 120 when the flexible panel 120 is folded. By using the longitudinal margin, the folded portion of the flexible panel 120 may not be excessively bent and may have a smooth curve line, as shown in FIG. 1B.

As shown in FIG. 1B, end edge portions 111a and 112a of the first and second supports 111 and 112, at which the folding device 113 is installed, may be rounded. Accordingly, the end edge portions 111a and 112a may support the flexible panel 120 so as to provide a state in which the flexible panel 120 is not excessively bent and is smoothly folded to have a semicircular shape. Thus, when the housing 110 is folded, excessive bending and damage to the flexible panel 120 may be avoided.

If the first and second supports 111 and 112 were to be coupled with each other so as to be folded with respect to a single hinge axis instead of the link members 113a and 113b, when the housing 110 is unfolded, since the interval between the first and second supports 111 and 112 is not changed, the central portion of the flexible panel 120, which is not fixed, may protrude upward due to a reduced longitudinal margin. Thus, when the housing 110 is unfolded, the flexible panel 120 may not be maintained flat. Accordingly, a user may experience inconvenience when viewing a screen of the flexible panel 120. On the other hand, if the housing 110 using a single hinge axis is unfolded and the flexible panel 120 is fixed to be flat, when the housing 110 is folded, since the flexible panel 120 has no longitudinal margin. Accordingly, the flexible panel 120 may be excessively bent or the two end portions of the flexible panel 120, which are fixed to the housing 110, may be detached due to compressive stress.

However, according to the present embodiment, when the housing 110 is folded and unfolded by using the first and second link members 113a and 113b that are folded and unfolded like scissors, the folded portion of the flexible panel 120 may be smoothly folded to have a semicircular shape, as shown in FIGS. 1A and 1B. Thus, the flexible panel 120 is not likely to be damaged. In addition, when the flexible panel 120 is unfolded, the first and second supports 111 and 112 may be slightly spaced apart from each other and the longitudinal margin of the flexible panel 120 may be strained. Accordingly, the central portion of the flexible panel 120 may not protrude upward. Thus, due to this structure, when the flexible panel 120 is folded and unfolded, a stable state may be maintained.

A coupling device such as a magnet 110a may be provided for locking the housing 110 so as to maintain the housing 110 in a folded state.

The flexible display device 100 having the above-described structure may be used as follows:

When the flexible display device 100 is carried or stored, the housing 110 may be folded, as shown in FIGS. 1A and 1B. The folded portion that is the central portion of the flexible panel 120 is supported by the housing 110 to have a smooth semicircular shape. Accordingly, a stable state in which the flexible display device 100 is not excessively bent and is not damaged may be maintained.

When the flexible display device 100 is used, the housing 110 may be unfolded such that the flexible panel 120 becomes flat, as shown in FIGS. 3A and 3B. In this case, as described above, the first and second link members 113a and 113b are horizontally unfolded and the interval between the first and second supports 111 and 112 is slightly increased. Accordingly, the central portion of the flexible panel 120, which is bent to have a smooth curve line, is strained to be flat. Thus, a user may see a clear image that is displayed on the flexible panel 120 that is completely unfolded.

States in which the flexible panel 120 is folded and unfolded may be stably maintained in the flexible display device 100 having the above-described structure. Accordingly, an apparatus with convenience of portability and usage may be obtained by using the flexible display device 100.

Figure 4:
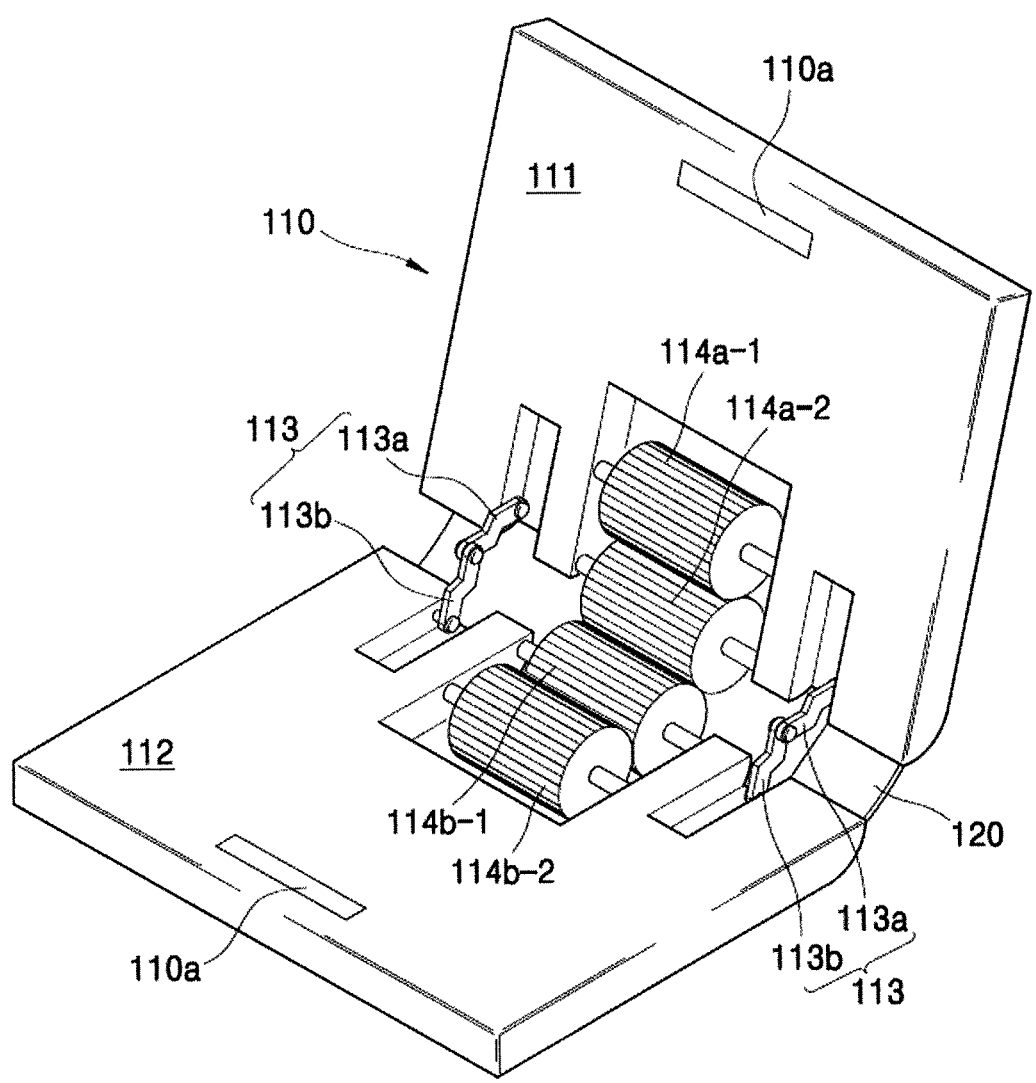
FIG. 4 is a perspective view of a modified example of a folding device of the flexible display device of FIG. 2A.

According to the above-described embodiment, the first and second supports 111 and 112 of the housing 110 are coupled with each other via the link members 113a and 113b only. In another implementation, as shown in FIG. 4, the first and second supports 111 and 112 may be coupled with each other by engaging a plurality of gear members 114a and 114b with each other. In this case, when the housing 110 is folded and unfolded, the gear members 114a and 114b may be rotatably engaged with each other. For example, in order to maintain a state where the housing 110 is unfolded about halfway, the gear members 114a and 114b may function as a proper brake. The structure shown in FIG. 4 may be advantageous for maintaining an angle at which the housing 110 is unfolded.

Figure 5:
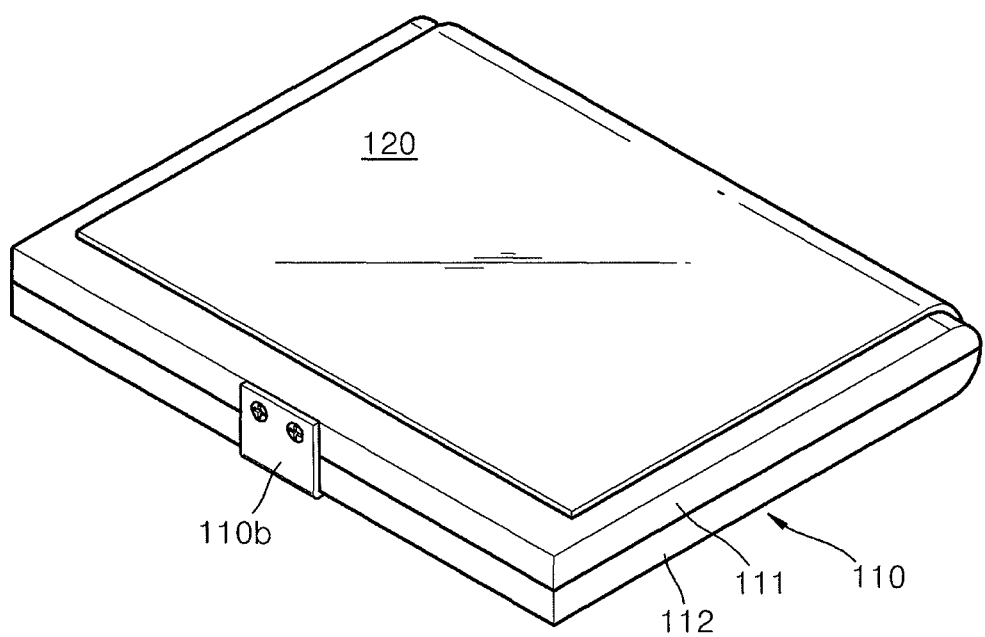
FIG. 5 is a perspective view of a modified example of a locking device of the flexible display device of FIG. 2A.

In the above-described embodiment, the magnet 110a may be used to lock the housing 110 when the first and second supports 111 and 112 of the housing 110 contact each other. In another implementation, as shown in FIG. 5, an elastic hook 110b that elastically bends may be used instead of the magnet 110a to lock the housing 110. For example, the elastic hook 110b may be installed on any one of the first and second supports 111 and 112 so as to lock the housing 110 that is folded.

By way of summation and review, a folding structure for completely folding a display panel in half is desirable for convenience of portability and maintenance. To this end, a method of coupling a flexible panel with a housing having a hinge structure to fold and unfold the flexible panel may be used. In this case, when a display device can be folded with respect to only a single hinge axis, the folded portions are likely to be excessively bent and the display panel is likely to be damaged. To prevent this, if the folded portion has a margin such that the flexible panel may be gradually folded, when the housing is unfolded, the display may not be completely spread. Accordingly, a structure for maintaining a stable state when the flexible panel is folded and unfolded is desirable.

Embodiments may provide a flexible display device that may prevent a flexible panel from being excessively bent and damaged when the flexible panel is folded. When the flexible panel is unfolded, the flexible panel may be smoothly maintained in a flat state. Further, a product that is stably folded and unfolded may be embodied by using the flexible display device according to embodiments.

While embodiments been particularly shown and described with reference to exemplary embodiments thereof, it will be understood by those of ordinary skill in the art that various changes in form and details may be made therein without departing from the spirit and scope thereof as defined by the following claims.

What is claimed is:

1. A flexible display device, comprising:
a housing including a first support and a second support, the first support having a first recess therein and the second support having a second recess therein, the first support and the second support being coupled with each other by a folding device so as to be folded and unfolded;
a flexible display panel coupled with the housing; and
gear members that are rotatably installed on the first support and the second support, respectively, to be engaged with each other,
wherein:
the first support has a first side and a second side, the second support has a first side and a second side, and the first side of the first support faces the first side of the second support when the first and second supports are folded,
the flexible display panel is on the second side of the first support and the second side of the second support,
the folding device includes a plurality of link members for rotatably connecting the first support and the second support to each other, the plurality of link members including link members coupled to sidewalls of the first recess and including link members coupled to sidewalls of the second recess, and
the gear members maintain an unfolding angle of the housing, the gear members including intermeshed first and second gear members, the first gear member having a rotation axis that is installed on the first support and the second gear member having a rotation axis that is installed on the second support such that there is a fixed relationship between the axes of the first and second gear members and the respective supports whether the housing is folded or unfolded, the gear members further including third and fourth gear members, the third gear member being intermeshed with the first gear member and the fourth gear member being intermeshed with the second gear member, the third gear member having a rotation axis that is installed on the first support and the fourth gear member having a rotation axis that is installed on the second support such that there is a fixed relationship between the axes of the third and fourth gear members and the respective supports whether the housing is folded or unfolded.

2. The flexible display device of claim 1, wherein the plurality of link members includes:
a first link member having a first end that is rotatably coupled with a sidewall of the first recess, and
a second link member having a first end that is rotatably coupled with a sidewall of the second recess and a second end that is rotatably coupled with a second end of the first link member.

3. The flexible display device of claim 1, wherein ends of the first and second supports, at which the folding device is installed, have rounded edge portions.

4. The flexible display device of claim 3, wherein the ends of the first and second supports, which have the rounded edge portions, together form a semicircular shape when the housing is fully folded.

5. The flexible display device of claim 1, wherein:
two end portions of the flexible panel are fixed to the first support and the second support, respectively, and
a central portion of the flexible panel between the first support and the second support is not fixed.

6. The flexible display device of claim 1, wherein the flexible panel is attached to an external surface of the housing when the housing is folded.

7. The flexible display device of claim 1, further comprising a locking device for locking the housing when the first support and the second support contact each other.

8. The flexible display device of claim 7, wherein the locking device includes a magnet that is installed on any one of the first support and the second support to couple the first support and the second support with each other by using a magnetic force.

9. The flexible display device of claim 7, wherein the locking device includes an elastic hook that is installed on any one of the first support and the second support.

* * * * *